US010072952B2

(12) United States Patent
Contet et al.

(10) Patent No.: US 10,072,952 B2
(45) Date of Patent: Sep. 11, 2018

(54) MEASUREMENT SENSOR WITH ELECTRICAL COMPONENT MOUNTING FOR A MOTOR VEHICLE

(71) Applicants: Continental Automotive France, Toulouse (FR); Continental Automotive GmbH, Hannover (DE)

(72) Inventors: Hervè Contet, Lamasquère (FR); Patrick Lopez, Roques sur Garonne (FR); Martin Throm, Toulouse (FR)

(73) Assignees: Continental Automotive France, Toulouse (FR); Continental Automotive GmbH, Hannover (DE)

(*) Notice: Subject to any disclaimer, the term of this patent is extended or adjusted under 35 U.S.C. 154(b) by 0 days.

(21) Appl. No.: 15/749,371

(22) PCT Filed: Aug. 1, 2016

(86) PCT No.: PCT/EP2016/001325
§ 371 (c)(1),
(2) Date: Jan. 31, 2018

(87) PCT Pub. No.: WO2017/028944
PCT Pub. Date: Feb. 23, 2017

(65) Prior Publication Data
US 2018/0224304 A1 Aug. 9, 2018

(30) Foreign Application Priority Data
Aug. 18, 2015 (FR) ...................................... 15 57787

(51) Int. Cl.
*G01M 15/02* (2006.01)
*G01D 11/24* (2006.01)
(Continued)

(52) U.S. Cl.
CPC ............ *G01D 11/24* (2013.01); *H01R 13/22* (2013.01); *H01R 43/20* (2013.01)

(58) Field of Classification Search
USPC ................ 73/114.26, 114.36, 114.77, 115.08
See application file for complete search history.

(56) References Cited

U.S. PATENT DOCUMENTS 6,392,406 B1   5/2002  Palfenier et al.
7,965,075 B2   6/2011  Mueller et al.
(Continued)

FOREIGN PATENT DOCUMENTS

DE   102005043413 A1   3/2007

OTHER PUBLICATIONS

International Search Report and Written Opinion for International Application No. PCT/EP2016/001325, dated Oct. 20, 2016, 8 pages.
(Continued)

*Primary Examiner* — Eric S McCall
(74) *Attorney, Agent, or Firm* — RatnerPrestia

(57) ABSTRACT

A measuring sensor for a motor vehicle, including a body and an electronic measurement module having an integrated circuit for measurement management and a plurality of connection pins that are able to be linked to an electrical communication network of a motor vehicle. The sensor includes an electrical component carrier to which an electrical component is fastened, the component having a first connection wire, connected electrically to a first portion of a first connection pin of the plurality of connection pins of the electronic measurement module and a second connecting wire, connected electrically to a second portion of a second connection pin of the plurality of connection pins of the electronic measurement module.

12 Claims, 7 Drawing Sheets

(51) Int. Cl.
    *H01R 43/20*        (2006.01)
    *H01R 13/22*        (2006.01)

(56)         References Cited

U.S. PATENT DOCUMENTS

| | | | |
|---|---|---|---|
| 2002/0180424 A1 | 12/2002 | Aoki et al. | |
| 2008/0198559 A1 | 8/2008 | Mueller et al. | |
| 2011/0072894 A1* | 3/2011 | Saito | F02D 41/187 73/114.34 |
| 2011/0138924 A1* | 6/2011 | Colombo | G01L 19/0092 73/756 |
| 2011/0174080 A1* | 7/2011 | Zorzetto | G01L 9/0051 73/756 |
| 2011/0179889 A1* | 7/2011 | De Volder | B29C 33/126 73/866.5 |
| 2013/0133412 A1* | 5/2013 | Wallner | H05K 3/284 73/115.02 |
| 2013/0255391 A1* | 10/2013 | Schlitzkus | G01L 19/148 73/753 |
| 2014/0096609 A1* | 4/2014 | Tsai | G10K 11/004 73/584 |
| 2014/0238370 A1* | 8/2014 | Pursifull | F02D 41/005 123/690 |
| 2015/0147912 A1* | 5/2015 | Lutz | H01R 13/5045 439/577 |
| 2016/0061642 A1* | 3/2016 | Arai | G01F 15/14 73/273 |
| 2016/0104978 A1* | 4/2016 | Chaumeny | H01R 13/6683 439/620.22 |
| 2016/0109279 A1* | 4/2016 | O'Neill | G01F 23/38 73/313 |
| 2016/0297122 A1* | 10/2016 | Fischer | B29C 45/1671 |
| 2016/0329037 A1* | 11/2016 | Wehling | G10K 9/22 |
| 2017/0343442 A1* | 11/2017 | Lee | G01L 19/0092 |
| 2018/0142655 A1* | 5/2018 | Thomas | F02M 57/005 |

OTHER PUBLICATIONS

English translation of the Written Opinion for International Application No. PCT/EP2016/001325, dated Oct. 20, 2016, 5 pages.

* cited by examiner

Fig 5
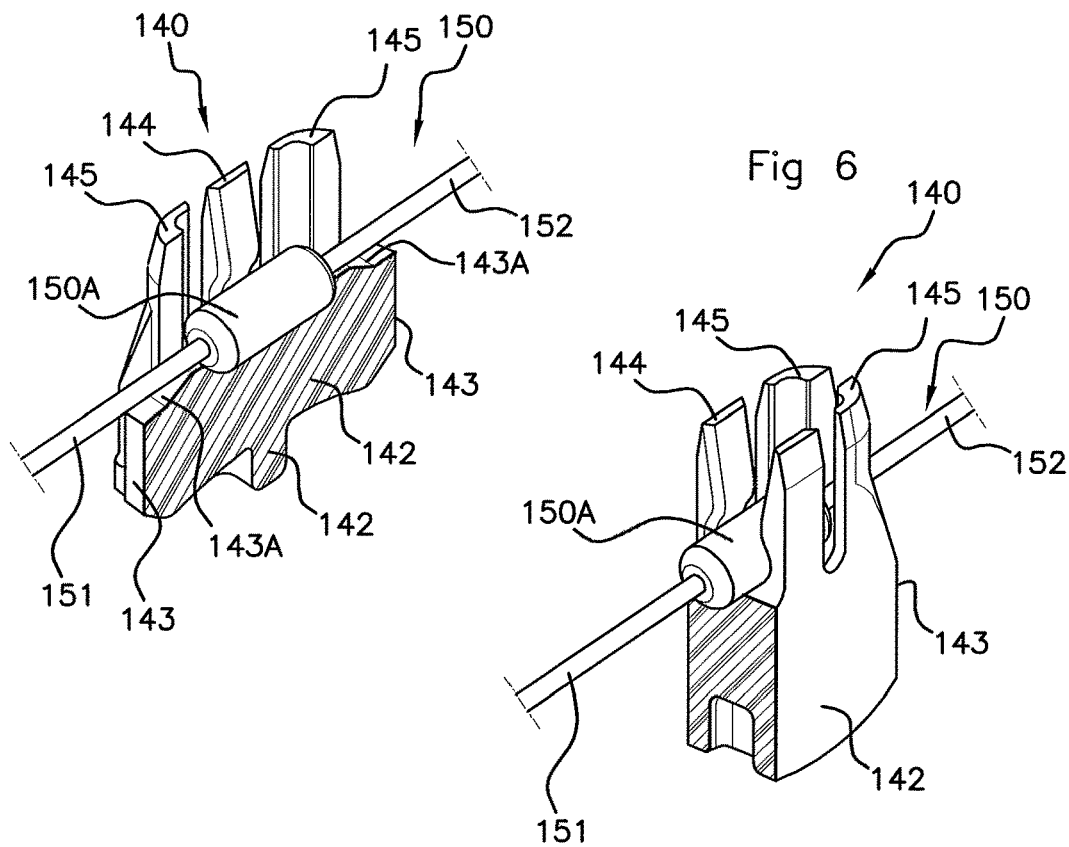
Fig 6
Fig 7
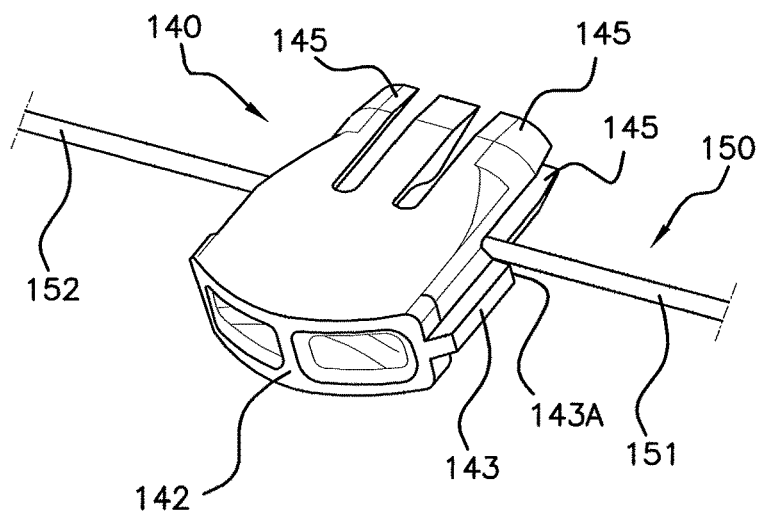

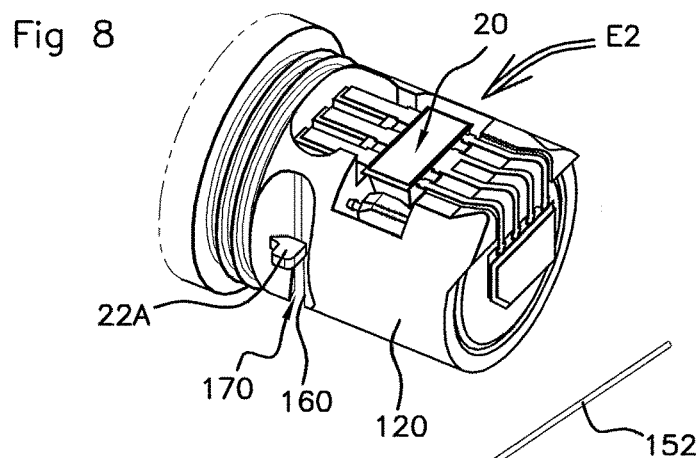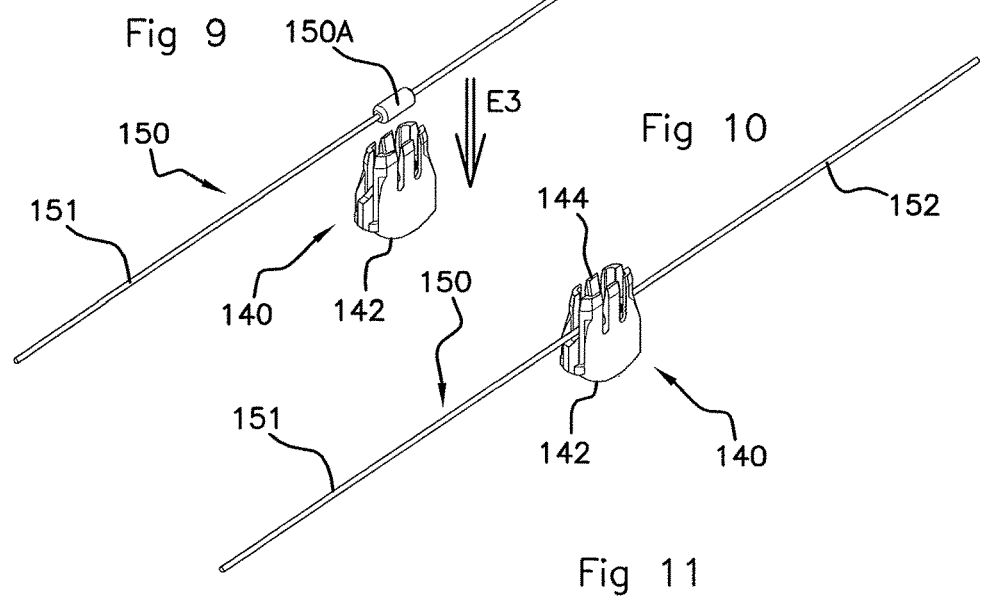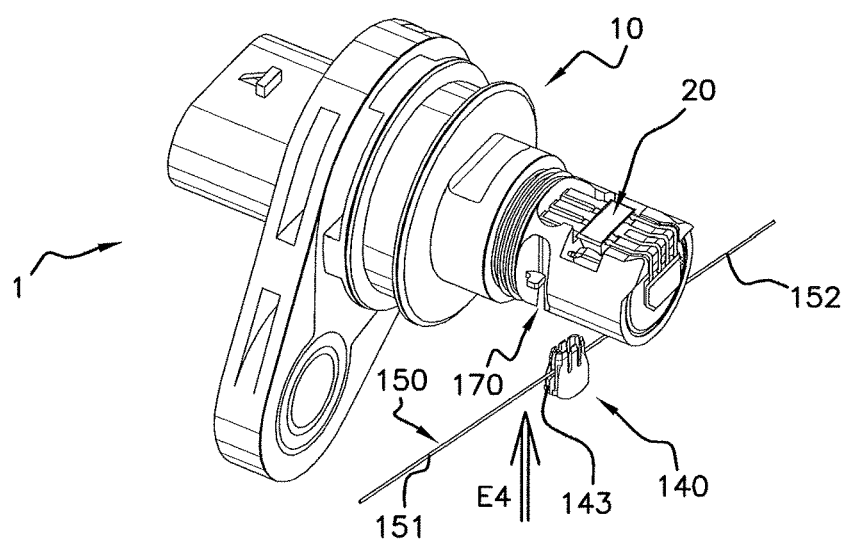

MEASUREMENT SENSOR WITH ELECTRICAL COMPONENT MOUNTING FOR A MOTOR VEHICLE

CROSS REFERENCE TO RELATED APPLICATIONS

This application is the U.S. National Phase Application of PCT International Application No. PCT/EP2016/001325, filed Aug. 1, 2016, which claims priority to French Patent Application No. 1557787, filed Aug. 18, 2015, the contents of such applications being incorporated by reference herein.

FIELD OF THE INVENTION

The invention pertains to the field of measurement sensors for motor vehicles, and relates more particularly to a method for manufacturing a measurement sensor for a motor vehicle, to a measurement sensor and to a motor vehicle comprising such a sensor.

BACKGROUND OF THE INVENTION

In a motor vehicle, it is known to use sensors for measuring the position or the rotational speed of a drive shaft. By way of example, such a sensor may be a sensor for measuring the position of a motor vehicle camshaft, termed TPO sensor ("True Power On", that is to say giving a position when it is powered up).

Such a sensor includes, in a known manner, a body made from a molded thermoplastic material and inside which is housed an electronic measurement module. This body makes it possible both to fasten the sensor in the vehicle and to protect the electronic module from the gases and the projections generated by the vehicle.

The electronic measurement module comprises, in a known manner, an integrated circuit linked to three pins for connecting the sensor to the electrical communication network of the vehicle in order to communicate the measurements, carried out by the sensor, to a computer of the vehicle. These three pins are a pin for supplying the electronic measurement module with electric power, an output pin for sending electrical signals from the sensor to the electrical communication network of the vehicle and a ground pin, respectively.

In order to improve the electromagnetic compatibility of the sensor, it is known to link some of the connection pins to one another using two-wire electrical components, for example of resistive or capacitive type. It is thus known, for example, to link the electrical power supply pin to the ground pin by way of a resistor.

The mounting of a two-wire component is carried out once the electronic measurement module has been mounted in the body, and requires the wires of the component to comply with the position at which they are soldered to the pins, and then requires the component to be soldered and the free end of the wires protruding from the solder joints to be cut off.

It may in addition be necessary to form what are termed "flexibility" loops on the two wires of the electrical component, in order to avoid the risks of cracking or breakage on wires when thermal shocks occur.

Such loops are formed by bending, before fastening of the electrical component, this being complex and difficult to reproduce in terms of geometry and requiring expensive tooling.

Furthermore, the size of the component may prove to be incompatible with the space available around the connection pins once the electronic measurement module has been mounted in the body of the sensor.

The mounting of the electrical component may thus prove to be complex, difficult to reproduce, time-consuming and expensive, thereby exhibiting significant drawbacks.

SUMMARY OF THE INVENTION

The aim of an aspect of the invention is to at least partly solve these drawbacks by proposing a simple, quick, reliable and effective solution for linking two connection pins of an electronic module of a measurement sensor for a motor vehicle by way of a two-wire electrical component.

To this end, one aspect of the invention is, first of all, a measurement sensor for a motor vehicle, said sensor comprising a body and an electronic measurement module, said electronic measurement module comprising an integrated circuit for measurement management and a plurality of connection pins that are able to be linked electrically to a communication network of a motor vehicle, said body comprising a base for fastening the sensor in a motor vehicle and an element for receiving the electronic measurement module, made from material of the base, comprising a first cylindrical portion delineating a reception space in which said electronic measurement module is mounted and a second cylindrical portion for linking the reception element to the base, the first cylindrical portion comprising means for receiving an electrical component carrier, said sensor furthermore comprising an electrical component carrier mounted in said reception means and to which a two-wire electrical component is fastened, said two-wire electrical component comprising a first connecting wire, connected electrically to a first portion of a first connection pin of the plurality of connection pins of the electronic measurement module, and a second connecting wire, connected electrically to a second portion of a second connection pin of the plurality of connection pins of the electronic measurement module.

Such a two-wire electrical component carrier is easy to manufacture and to mount in the reception means of the first cylindrical portion. In addition, this carrier simplifies and improves the shaping and the mounting of a two-wire electrical component while at the same time optimizing the space that it occupies to connect it to some of the connection pins of the electronic measurement module. Specifically, the electrical component carrier makes it possible to drastically reduce the bulk of the component in its bent and cut configuration.

The reception means preferably comprise two grooves into which the electrical component carrier is inserted. These grooves enable easy guidance of the carrier when the sensor is mounted, while at the same time ensuring that it is held in the body of the sensor.

According to one aspect of the invention, the electrical component carrier comprises a base from which means for fastening the electrical component extend.

These holding means preferably take the form of two tabs that make it possible to clamp the electrical component. Such a base makes it possible in particular to hold the carrier in order to insert it into the reception means. The holding tabs are a simple, reliable and effective means for securely holding the electrical component in the carrier, in particular when it is inserted into the reception means.

According to another aspect of the invention, the electrical component carrier comprises two ribs for guiding the carrier in the grooves, said ribs being positioned on either side of the base and forming a simple, reliable and effective means for guiding the carrier in the grooves of the body.

The ribs advantageously comprise, at one end, a curved wall enabling the connecting wires of the electrical component to be shaped against the pin portions so as to ensure the effective electrical connection thereof, while at the same time enabling the creation of flexibility loops in order to avoid the risks of cracking or breakage of the wires of the component following thermal shocks.

According to one aspect of the invention, the sensor furthermore comprises a protective overmolding over the electronic measurement module, completely enveloping the element for receiving the electronic measurement module so as to protect the electronic measurement module, in particular from gases or liquids.

According to one aspect of the invention, the sensor furthermore comprises sealing means made from material of the second cylindrical portion and that make it possible to ensure the sealtightness of the electronic measurement module, in particular with respect to liquids.

An aspect of the invention also relates to a motor vehicle comprising a sensor such as presented previously.

An aspect of the invention relates, lastly, to a method for manufacturing a sensor such as presented previously, said method comprising:
  a step of mounting the electronic measurement module in the reception space,
  a step of mounting a two-wire electrical component on the two-wire electrical component carrier,
  a step of inserting said electrical component carrier into the reception means of the first cylindrical portion, such that the first connecting wire of the electrical component comes into contact with a first portion of a first connection pin of the plurality of connection pins of the electronic measurement module and that the second connecting wire of the two-wire electrical component comes into contact with a second portion of a second connection pin of the plurality of connection pins of the electronic measurement module,
  a step of soldering said first connecting wire to said first portion and said second connecting wire to said second portion.

The method according to an aspect of the invention is easy to implement and enables mounting of the sensor that is all at once easy, quick and reliable. The use of a two-wire electrical component carrier advantageously makes it possible to place the two-wire electrical component in a predetermined set position on the carrier and then to insert the carrier into the reception means in order to guarantee, quickly and simply, effective contact of the first connecting wire with the first connection pin and of the second connecting wire with the second connection pin.

The method preferably comprises a step of mounting a magnet in the reception space in the case of a measurement sensor with an integrated magnet.

More preferably, the method furthermore comprises a step of overmolding the reception element with a thermoplastic material.

According to one aspect of the invention, the method furthermore comprises, following the insertion step, a step of cutting the free end of the first connecting wire and of the second connecting wire, respectively, of the two-wire electrical component.

BRIEF DESCRIPTION OF THE DRAWINGS

Other features and advantages of the invention will emerge during the following description given with reference to the appended figures, which are given by way of nonlimiting example and in which identical references are given to similar objects:

FIGS. 5, 6 and 7 are partial schematic perspective views of a carrier on which is mounted a two-wire electrical component.

FIG. 8 is a partial schematic perspective view of the reception element of the sensor of FIG. 1, in which is mounted an electronic measurement module, before mounting of the two-wire electrical component carrier.

FIG. 9 schematically illustrates the mounting of a two-wire electrical component in the electrical component carrier.

FIG. 10 schematically illustrates an electrical component carrier in which is mounted a two-wire electrical component.

FIG. 11 schematically illustrates the mounting of the carrier of FIG. 10 in the sensor of FIG. 8.

DETAILED DESCRIPTION OF THE PREFERRED EMBODIMENTS

The measurement sensor according to an aspect of the invention is intended to be mounted in a motor vehicle. Such a sensor may, for example, be a sensor for measuring the speed of the vehicle, a sensor for measuring the position of a drive shaft of the vehicle, a sensor for measuring the rotational speed of a drive shaft of the vehicle, or a pressure measurement sensor.

Figure 1:
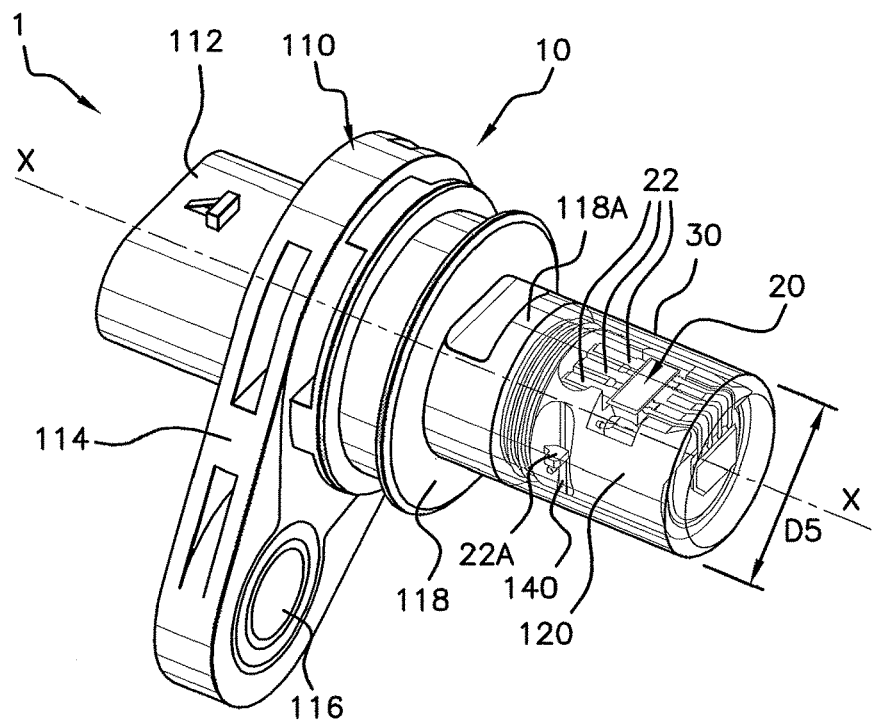
FIG. 1 schematically illustrates, partly transparently, one form of implementation of the system according to the invention.
Figure 2:
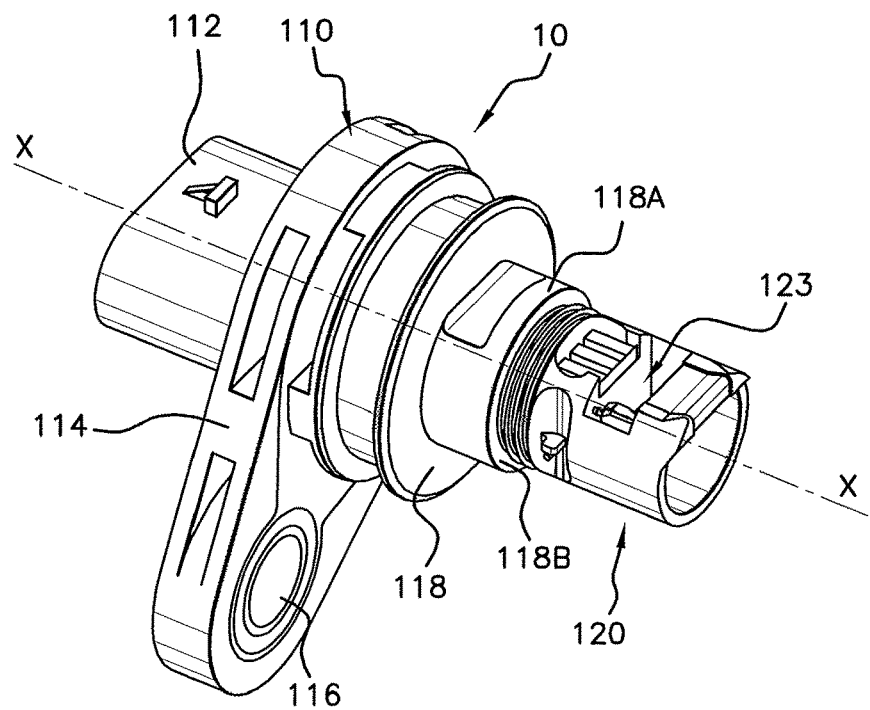
FIG. 2 schematically illustrates, in perspective, the body of the sensor of FIG. 1, before other elements of the sensor are mounted.

With reference to FIGS. 1 and 2, the measurement sensor 1 according to the invention comprises a body 10 and an electronic measurement module 20 mounted in said body 10.

The body 10 comprises a base 110 for fastening the sensor 1 in a motor vehicle, an element 120 for receiving the electronic measurement module 20, and sealing means. The base 110 comprises, first of all, a connecting portion 112, in this example taking the form of a barrel with an oblong cross section and made from material of the base 110 and extending along a longitudinal axis XX.

This connecting portion 112 is designed to enable the sensor 1 to be connected to an electrical connector of the vehicle (not shown) such that the electronic measurement module 20 communicates with an electrical communication network of the vehicle (not shown), in particular to send to it signals representative of the measurements that said electronic measurement module 20 carries out during operation of the sensor 1.

The base 110 then comprises a plate 114 made from material of said base 110 and extending perpendicularly to the longitudinal axis XX. This plate 114 delineates an orifice in which is mounted a fastening ring 116, enabling the sensor 1 to be mounted on an element of a motor vehicle, for example facing a drive shaft.

The base 110 also comprises a linking part 118 comprising a cylindrical portion 118A, with a circular cross section, for linking to the reception element 120.

To this end, the cylindrical linking portion 118A comprises a linking wall 118B with a circular cross section, at which wall the reception element 120 is linked to the cylindrical linking portion 118A.

Figure 3:
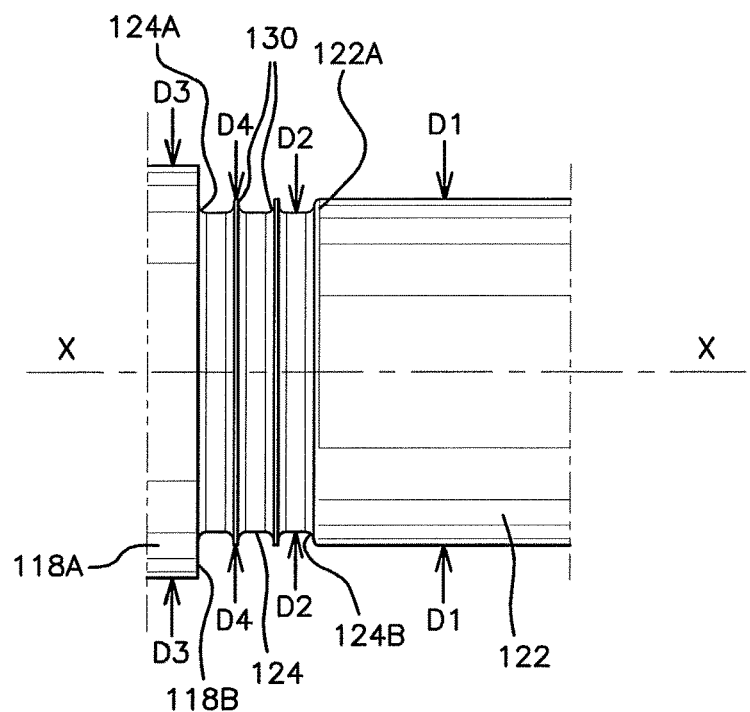
FIG. 3 is a partial schematic view of the side of the reception element and of the linking wall of the sensor of FIG. 1.

The reception element 120 is made from material of the linking part 118 and comprises, with reference to FIG. 3, a first cylindrical portion 122 defining an external diameter D1 and a second cylindrical portion 124 with a circular cross section defining an external diameter D2 smaller than the diameter D1 of the first cylindrical portion 122. It will be noted that the external diameter D3 of the linking portion 118A is greater than the diameter D1 of the first cylindrical portion 122 and than the diameter D2 of the second cylindrical portion 124.

It will be noted that the first cylindrical portion 122 overall defines a cylindrical volume, but also delineates apertures and spaces in said cylindrical volume, such that the cross section of the first cylindrical portion 122 is not necessarily circular over the entire length of the first cylindrical portion 122. Moreover, for the sake of clarity, the various cavities formed in the element 120 for receiving the electronic measurement module 20 have not been shown in FIG. 3 in order to be able to precisely define the diameters of the various elements illustrated in said FIG. 3.

As illustrated in FIGS. 1 to 4, the first cylindrical portion 122 and the second cylindrical portion 124 extend along one and the same longitudinal axis, which is coincident with the longitudinal axis XX.

Figure 4:
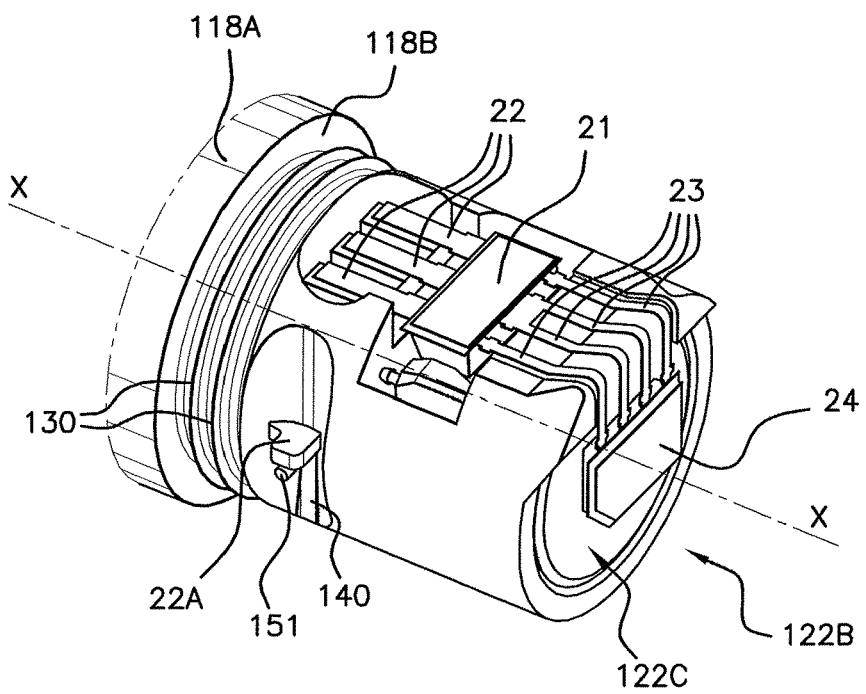
FIG. 4 is a partial schematic perspective view of the reception element of the sensor of FIG. 1, in which is mounted a magnet, an electronic measurement module and a two-wire electrical component carrier, before overmolding of the reception element.

With reference to FIG. 3, the first cylindrical portion 122 has a linking end 122A and, with reference to FIG. 4, a free end 122B defining a front face 122C.

With reference to FIG. 3, the second cylindrical portion 124 has a first end 124A and a second end 124B.

The reception element 120 is linked to the linking wall 118B of the base 110 at the first end 124A of the second cylindrical portion 124.

The first cylindrical portion 122 is linked, by its linking end 122A, to the second end 124B of the second cylindrical portion 124.

With reference to FIG. 2, the first cylindrical portion 122 delineates a space 123 for receiving the electronic measurement module 20.

Figure 18:
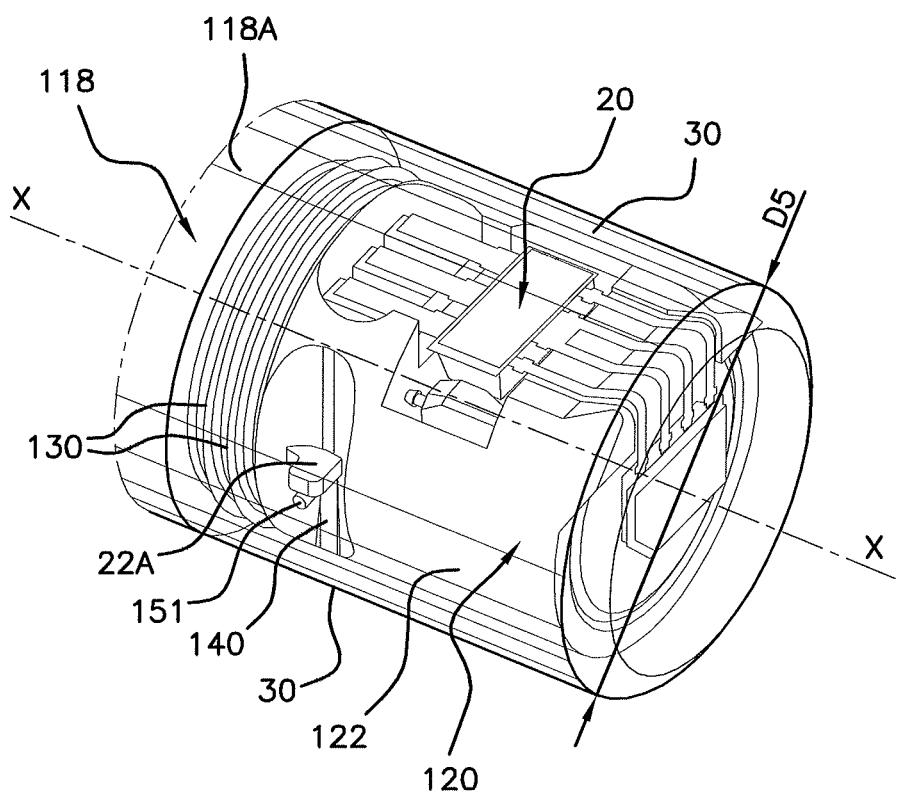
FIG. 18 illustrates the reception element of the sensor of FIG. 1 after overmolding.

In order to protect the sensor 1, in particular from the gases and projections that may be generated by its surroundings, the sensor 1 may comprise, as illustrated transparently for the sake of clarity in FIGS. 1 and 18, a protective overmolding 30 surrounding the element 120 for receiving the electronic measurement module 20. It will be noted that the protective overmolding 30 is optional and that, in another form of implementation, the sensor 1 might not have a protective overmolding 30, or said protective overmolding might be replaced with an equivalent protective means, such as, for example, a well or a hood.

As illustrated in FIG. 4, the electronic measurement module 20 comprises, in this example, an integrated circuit 21 for measurement management, from which there extend a plurality of connection pins 22 that are intended to be connected electrically to an electrical communication network of the vehicle and a plurality of linking pins 23 that are connected electrically to a sensing element 24 mounted on the front face 122C of the free end 122B of the first cylindrical portion 122.

In this example, which does not limit the scope of the protection of the present invention, there are three connection pins 22 that ensure, in a known manner, the transmission of electrical power supply signals, the transmission of the measurement signals sent by the integrated circuit 21 and the ground function, respectively.

The pins 22A and 22B are both portions of the three pins 22 that need to be connected to a two-wire electrical component, for example of resistive or capacitive type, for the purpose of electromagnetically protecting the measurement module 20.

The sensing element 24, in a known manner, makes it possible to convert physical quantities of a parameter, such as for example a position, a speed, a pressure, etc., into electrical signals that are then sent, by the integrated circuit 21 for measurement management, to a computer of the motor vehicle.

The sealing means of the body 10 make it possible to prevent liquids from flowing between the body 10 and the protective overmolding 30 to the electronic measurement module 20.

It will be noted that these sealing means are optional and that, in another form of implementation, the sensor 1 might not include sealing means.

In the example illustrated, these sealing means are made from material of the second cylindrical portion 124, and advantageously take the form of two circular fins 130 with an external diameter D4, extending radially with respect to the longitudinal axis XX from the periphery of the second cylindrical portion 124, over a small radial distance, preferably less than 1 mm, for example of the order of 0.7 mm.

In one preferred form of implementation, the difference between the diameter D4 of the circular fins 130 and the diameter D3 of the linking portion 118A is less than 2 mm, for example of the order of 1.6 mm.

With reference to FIG. 1, the protective overmolding 30 has a cylindrical shape with a circular cross section with an external diameter D5, completely surrounding the element 120 for receiving the electronic measurement module 20 in such a way as to protect it, for example from the projections or from the gases generated by the motor vehicle.

In this example, the diameter D3 of the linking wall 118B and the diameter D5 of the protective overmolding 30 are equal, the mold used to form the protective overmolding 30 having an internal diameter equal to the diameter D3 of the linking wall 118B so as advantageously to be able to easily hold the body 10 of the sensor 1 in the mold while injecting the overmolding material, thereby making it easy to manufacture the sensor 1.

According to an aspect of the invention, with reference to FIGS. 1, 4-7 and 9-18, the first cylindrical portion 122 of the reception element 120 of the body 10 of the sensor 1 comprises means for receiving an electrical component 150 carrier 140.

The electrical component 150 mounted on the carrier is a two-wire, respectively 151 and 152, electrical component, for example of resistive or capacitive type.

The reception means comprise, in this example, as illustrated in FIGS. 8 and 11, two grooves 160 for guiding and stopping the carrier 140 and a space 170 for receiving the carrier 140.

The two grooves 160 and the space 170 for receiving the carrier 140 are formed in the first cylindrical portion 122, extending on either side of said first cylindrical portion 122 symmetrically about the longitudinal axis XX.

The space 170 for receiving the carrier 140 is open to the space 123 for receiving the electronic measurement module 20, such that the plurality of connection pins 22 of the electronic measurement module 20 extend partly into the space 170 for receiving the carrier 140, in particular the portions 22A and 22B of the pins, so that the connecting wires 151, 152 of the electrical component 150 that is mounted on the carrier 40, which carrier is itself mounted in the grooves 160, are able to come into contact with the two portions 22A and 22B, respectively, of the pins 22.

As illustrated in FIGS. 5 to 7, the electrical component 150 carrier 140 takes the form of a base 142, formed for example by molding a thermoplastic material, comprising means for fastening the electrical component 150 and two ribs 143 for guiding the carrier 140 in the grooves 160. These fastening means in this example take the form of a clamp formed of two tabs 144 made from material of said base and enabling the body 150A of the electrical component 150 to be received and held.

In order to guide the carrier 140 when it is inserted into the reception space 170, the carrier 140 furthermore comprises four insertion fingers 145 extending from the base 142 so as to clamp, two by two, the two connecting wires 151, 152 of the electrical component 150.

The ribs 143 for guiding the carrier 140 are positioned on either side of the base 142 and are configured to be inserted into the two grooves 160, respectively. In this example, these ribs 143 are made from material of the base 142. As a variant, these ribs 143 could be added and/or made from material of the holding clamps 144.

The ribs 143 advantageously comprise, at one end, a curved wall 143A enabling the connecting wires 151, 152 of an electrical component 150 to be shaped against the pin portions 22A, 22B so as to ensure the effective electrical connection thereof, as will be described hereinafter.

The two-wire electrical component 150 comprises a component body 150A (for example, the resistive or capacitive portion), a first connecting wire 151 and a second connecting wire 152 each extending on either side of said component body 150A. By way of non-limiting example and in a standard manner, the two-wire electrical component 150 may be a resistor or a capacitor.

A preferred mode of manufacturing the sensor will now be described.

Figure 12:
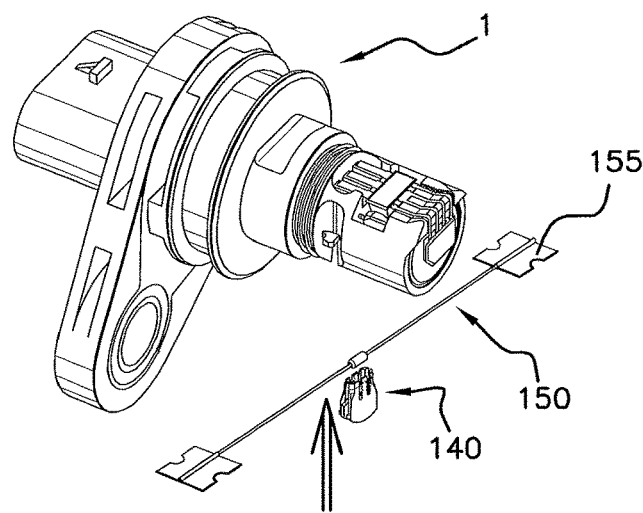
FIGS. 12, 13 and 14 illustrate the steps of mounting, in a sensor, a carrier comprising a two-wire electrical component provided on an automatic or semi-automatic component line.
Figure 13:
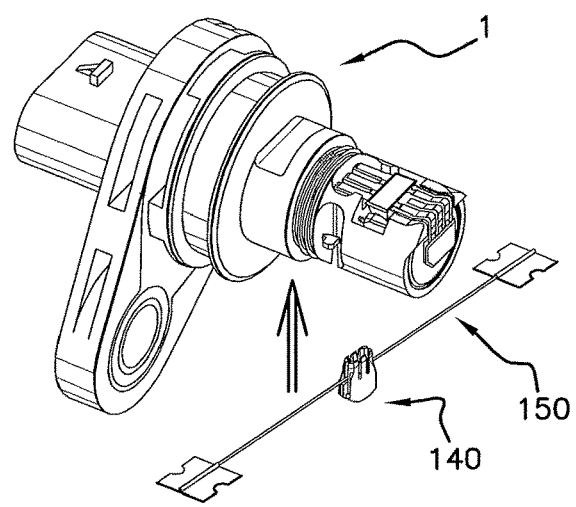

With reference to FIG. 12, in a step E1, the body 10 of the sensor 1 is first of all molded (FIG. 2). It will be noted that the body 10 could be manufactured in any other suitable manner.

This molding makes it possible to create a single part, i.e. in one piece, comprising the connecting portion 112, the plate 114 and the part 118 for linking the base 110 and the first cylindrical portion 122, the second cylindrical portion 124 and the fins 130 of the reception element 120.

Once the body 10 has been produced, the electronic measurement module 20 is then mounted in the reception space 123 of the first cylindrical portion 122 of the reception element 120 of the body 10 in a step E2 (FIG. 8).

It will be noted that, at this stage, a magnet may also be mounted in the reception space 123 if necessary, for example in the event of a sensor 1 with a ferromagnetic target being used.

Once mounted in the reception space 123 of the first cylindrical portion 122, the plurality of connection pins 22 of the measurement module extend partly into the space 170 for receiving the carrier 140, in particular a first connection pin 22 portion 22A extends to the end of a groove 160 and a second connection pin 22 portion 22B extends similarly to the end of the other groove 160.

Next, in a step E3, as illustrated in FIGS. 9 and 10, a two-wire electrical component 150, for example a resistor or a capacitor, is mounted on the carrier 140.

To this end, the first connecting wire 151 of the component 150 is simply positioned between two insertion fingers 145, and the second connecting wire 152 of the component 150 is simply positioned between the other two insertion fingers 145 of the carrier 140, such that the component body 150A is inserted between the tabs 144 of the carrier until the tabs 144 clamp the body of the component so as to hold it.

It should be noted that the tabs 144 may be moved apart momentarily during the step of inserting the electrical component 150, for example by the tool used for the mounting, so as to facilitate the insertion of the electrical component 150 into the carrier 140.

In a step E4, as illustrated in FIG. 11, the two ribs 143 for guiding the carrier 140 are then inserted into the grooves 160, holding the carrier 140 by the base 142, for example, such that the carrier 140 slides in said grooves 160. In doing this, the carrier 140 moves in translation into the reception space 170 until, firstly, the first connecting wire 151 comes into contact with a first pin portion 22A of a pin 22, for example the power supply pin, and, secondly, the second connecting wire 152 comes into contact with a second pin portion 22B of another pin 22, for example the ground pin.

The insertion of the carrier 140 advantageously enables the connecting wires 151, 152 of the electrical component 150 to match the shape of the curved walls 143A of the corresponding guide rib 143, such that the connecting wires 151, 152 come into contact with the pin portions 22A and 22B, respectively.

Bending the wires 151, 152 by inserting the carrier 140 into the body 10 of the sensor 1 makes it possible to overcome large dimensional deviations linked to the prior cutting and the prior bending of the wires 151, 152 of the electrical component 150, also to achieve a space saving for defining the carrier 140, to create flexibility loops on the wires 151, 152 and to make it easy to insert and position the electrical component 150 in the reception space 170 in order in particular to significantly reduce or even to eliminate any soldering problems, thus generating few or even no non-compliant parts.

It will furthermore be noted that the first connecting wire 151 and the second connecting wire 152 could be shaped before or after the component 150 is mounted on the carrier 140, in order to enable them to be brought into contact with the first and second portions 22A and 22B of the two connection pins 22 of the electronic measurement module 20.

It is thereafter possible, in a step E5, to solder the connecting wires 151, 152 to the corresponding connection pin portions 22A, 22B in order to enable them to be electrically connected, respectively, and then to cut the connecting wires 151, 152 of the electrical component 150 very close to the connection pin portions 22A, 22B if necessary.

The soldering step E5 may be carried out before or after the connecting wires 151, 152 of the electrical component 150 are cut.

It will also be noted that the mounting of the electrical component 150 in the carrier 140 may advantageously be carried out using the same assembly tooling as that used in the previous steps El to E3, in particular in the case of an assembly performed on an automatic or semi-automatic line. It is thus possible for example, with reference to FIGS. 12 to 14, to position the carrier 140 and the electrical component 150 with respect to the body 10 in which the electronic measurement module 20 is mounted by taking for example, as a reference, the holes of the cardboard strips 155 on which, in a known manner, the two-wire electrical components 150 are supplied.

Figure 14:
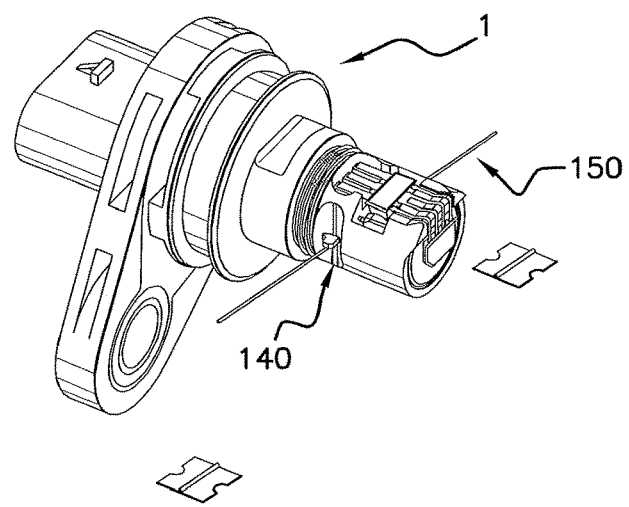

More precisely, as illustrated in FIG. 12, the carrier 140 and the electrical component 150 are positioned beforehand in a precise manner with respect to the reception space 170 of the body 10. Next, as illustrated, in FIG. 13, the carrier 140 is moved until the electrical component 150 is fastened in the carrier 140. As illustrated in FIG. 14, the connecting wires 151, 152 of the electrical component 150 are cut between the cardboard strips 155 and the connection pin portions 22A, 22B, for example to a distance that leaves the option to perform a final subsequent cutting of the connecting wires 151, 152 very close to the connection pin portions 22A, 22B if necessary, illustrated in FIG. 15.

Figure 15:
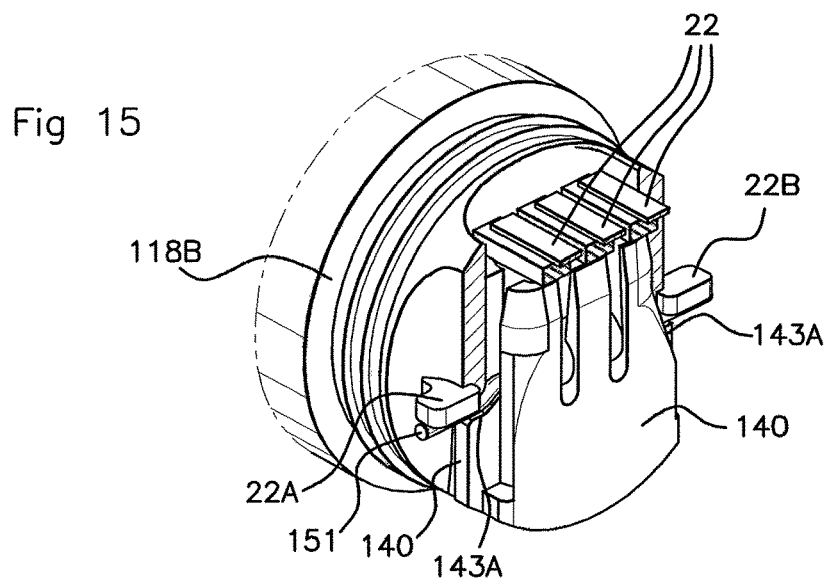
FIG. 15 is a partial schematic perspective view of the sensor of FIG. 1 after mounting of the electrical component carrier.

FIG. 15 makes it possible to visualize the bending of the connecting wires 151, 152 by the curved walls 143A of the ribs 143 for guiding the carrier 140 at the end of insertion by way of the carrier 140, such that the wires 151, 152 are pressed against the pin portions 22A, 22B.

Figure 16:
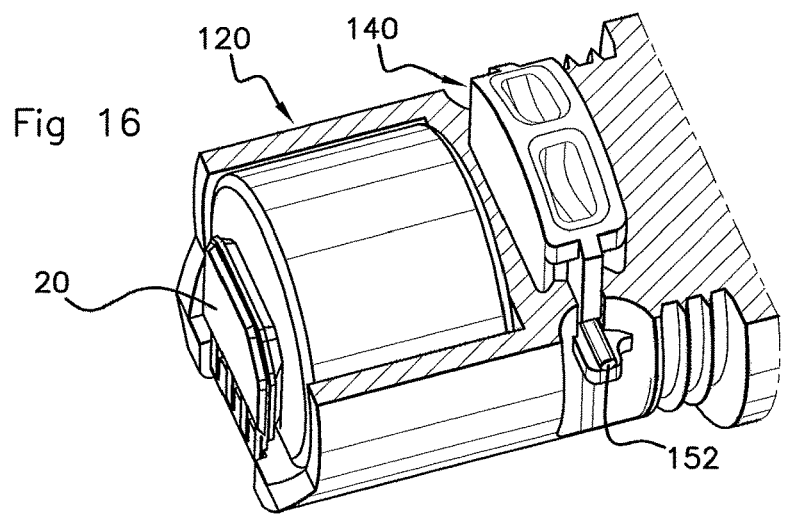
FIG. 16 is a partial schematic perspective view of a sensor according to the invention comprising a magnet, after mounting of the electrical component carrier.

The position of the carrier 140 at the end of travel, that is to say when it is inserted entirely into the reception space 170 of the body 10, illustrated in FIG. 16, makes it possible to improve the sealtightness of the sensor 1, as it makes it possible to overcome, at least partly, the defects linked to the effects of shrinkage of a protective overmolding 30 in this high-volume zone (close to the fins 130).

Figure 17:
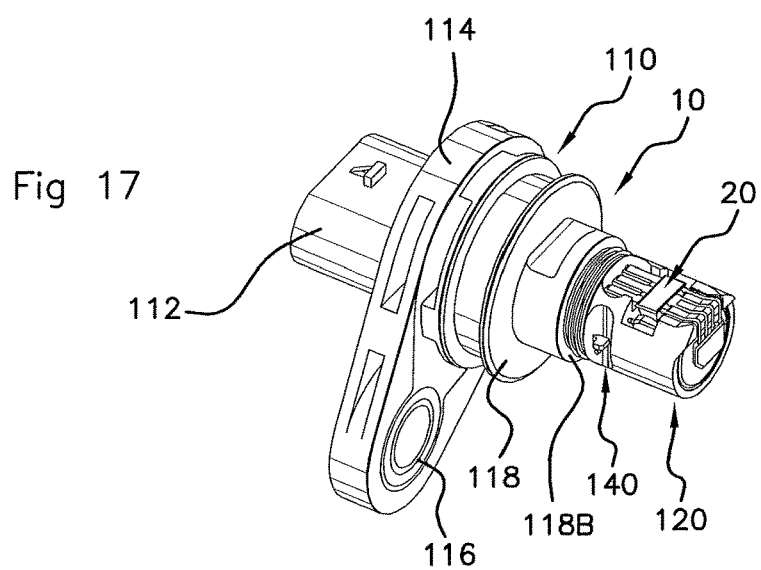
FIG. 17 is a schematic perspective view of a sensor according to the invention after mounting of the electrical component carrier and before overmolding of the reception element.

Once the carrier 140 has been inserted and the electrical component 150 has been soldered to the pin portions 22A, 22B, as illustrated in FIG. 17, in an optional step E6, as illustrated in FIG. 18, the reception element 120 is then overmolded with a thermoplastic material, for example such that the external diameter D5 of the protective overmolding 30 thus obtained is in a cylindrical shape with a circular cross section and is substantially equal to the third diameter D3. It is noted that, in this case, the linking wall 118B linking the linking portion 118 and the base 110 then forms a surface for stopping the thermoplastic overmolding material.

During this overmolding, it will be noted that a small difference between the diameter D4 of the circular fins 130 and the diameter D3 of the linking portion 118A, on the one hand, and that a small difference between the diameter D2 of the second cylindrical portion 124 and the diameter D4 of the circular fins 130, on the other hand, make it possible to ensure that the deviation between the volume of thermoplastic material injected around the first cylindrical portion 122 and the volume of thermoplastic material injected around the second cylindrical portion 124 is small, for example less than 30%. This makes it possible to greatly limit or even to prevent the shrinkage, that is to say the movement, of the thermoplastic material at the circular fins when said material cools after overmolding, thus avoiding the formation of cracks on said fins 130 that could reduce the sealtightness of the sensor 1, in particular with respect to liquids.

It should be noted, lastly, that the present invention is not limited to the examples described above, and is open to many variants that are accessible to those skilled in the art. In particular, the shapes and dimensions of the elements of the sensor 1, as shown in the figures so as to illustrate an exemplary embodiment of the invention, should not be interpreted as being limiting.

The invention claimed is:

1. A measurement sensor for a motor vehicle, said sensor comprising:
   a body and
   an electronic measurement module, said electronic measurement module comprising:
      an integrated circuit for measurement management and
      a plurality of connection pins that are able to be linked electrically to a communication network of a motor vehicle,
   said body comprising:
      a base for fastening the sensor in the motor vehicle and
      an element for receiving the electronic measurement module, made from material of the base, comprising a first cylindrical portion delineating a reception space in which said electronic measurement module is mounted and a second cylindrical portion for linking the reception element to the base, the first cylindrical portion comprising means for receiving an electrical component carrier,
   said sensor furthermore comprising an electrical component carrier mounted in said means for receiving and to which a two-wire electrical component is fastened, said two-wire electrical component comprising a first connecting wire, connected electrically to a first portion of a first connection pin of the plurality of connection pins of the electronic measurement module, and a second connecting wire, connected electrically to a second portion of a second connection pin of the plurality of connection pins of the electronic measurement module.

2. The sensor as claimed in claim 1, said sensor furthermore comprising a protective overmolding over the electronic measurement module, completely enveloping the element for receiving the electronic measurement module.

3. The sensor as claimed in claim 1, said sensor furthermore comprising a seal made from a material of the second cylindrical portion.

4. A motor vehicle comprising a sensor as claimed in claim 1.

5. The sensor as claimed in claim 1, wherein the electrical component carrier comprises a base from which two tabs for holding the electrical component extend.

6. The sensor as claimed in claim 5, wherein the electrical component carrier comprises two ribs for guiding the carrier in the grooves, said ribs being positioned on either side of the base.

7. A method for manufacturing a sensor as claimed in claim 1, said method comprising:
   a step of mounting the electronic measurement module in the reception space,
   a step of mounting a two-wire electrical component on the two-wire electrical component carrier,
   a step of inserting said electrical component carrier into the reception means of the first cylindrical portion, such that the first connecting wire of the electrical component comes into contact with a first portion of a first connection pin of the plurality of connection pins of the electronic measurement module and that the second connecting wire of the two-wire electrical component comes into contact with a second portion of a second connection pin of the plurality of connection pins of the electronic measurement module, a step of soldering said first connecting wire to said first portion and said second connecting wire to said second portion.

8. The method as claimed in claim 7, said method furthermore comprising a step of overmolding the reception element with a thermoplastic material.

9. The sensor as claimed in claim 1, wherein the reception means comprise two grooves into which the electrical component carrier (140) is inserted.

10. The sensor as claimed in claim 9, wherein the electrical component carrier comprises a base from which two tabs for holding the electrical component extend.

11. The sensor as claimed in claim 9, wherein the electrical component carrier comprises two ribs for guiding the carrier in the grooves, said ribs being positioned on either side of the base.

12. The sensor as claimed in claim 11, wherein the ribs comprise, at one end, a curved wall enabling the connecting wires of the electrical component to be shaped against the pin portions so as to ensure the effective electrical connection thereof.

* * * * *